United States Patent [19]

Manecke

[11] Patent Number: 4,491,680

[45] Date of Patent: Jan. 1, 1985

[54] MOUNTING ARRANGEMENT FOR A CONDITION SENSING PROBE AND METHOD OF MAKING THE SAME

[75] Inventor: Siegfried E. Manecke, Indiana, Pa.

[73] Assignee: Robertshaw Controls Company, Richmond, Va.

[21] Appl. No.: 569,516

[22] Filed: Jan. 9, 1984

[51] Int. Cl.³ ............................................. H01L 35/02
[52] U.S. Cl. ..................................... 136/230; 29/573; 136/201; 136/242; 374/208
[58] Field of Search ....................... 136/230, 242, 201; 374/208; 29/573

[56] References Cited

U.S. PATENT DOCUMENTS

| | | | |
|---|---|---|---|
| 2,139,582 | 12/1938 | Harlow | 374/208 |
| 3,290,178 | 12/1966 | Loveland | 136/242 |
| 4,164,433 | 8/1979 | Granahan et al. | 136/242 X |
| 4,280,278 | 7/1981 | Forsman | 33/143 R |
| 4,376,227 | 3/1983 | Hilborn | 136/232 |
| 4,412,090 | 10/1983 | Kawate et al. | 136/230 |

Primary Examiner—Leland A. Sebastian
Attorney, Agent, or Firm—Candor, Candor & Tassone

[57] ABSTRACT

A mounting arrangement for a condition sensing probe and method of making the same are provided, the probe being disposed in an opening of a wall of an apparatus and having opposed ends one of which is disposed beyond the interior side of the wall and the other of which extends beyond the exterior side of the wall. A bracket is secured to the wall and has an interconnecting part operatively interconnected to an interconnecting part of the probe whereby the bracket holds the probe in a fixed axial position in the opening of the wall. The interconnecting part of the probe comprises a slot in the probe and the interconnecting part of the bracket comprises an abutment disposed in the slot to provide the sole interconnection between the bracket and the probe.

20 Claims, 9 Drawing Figures

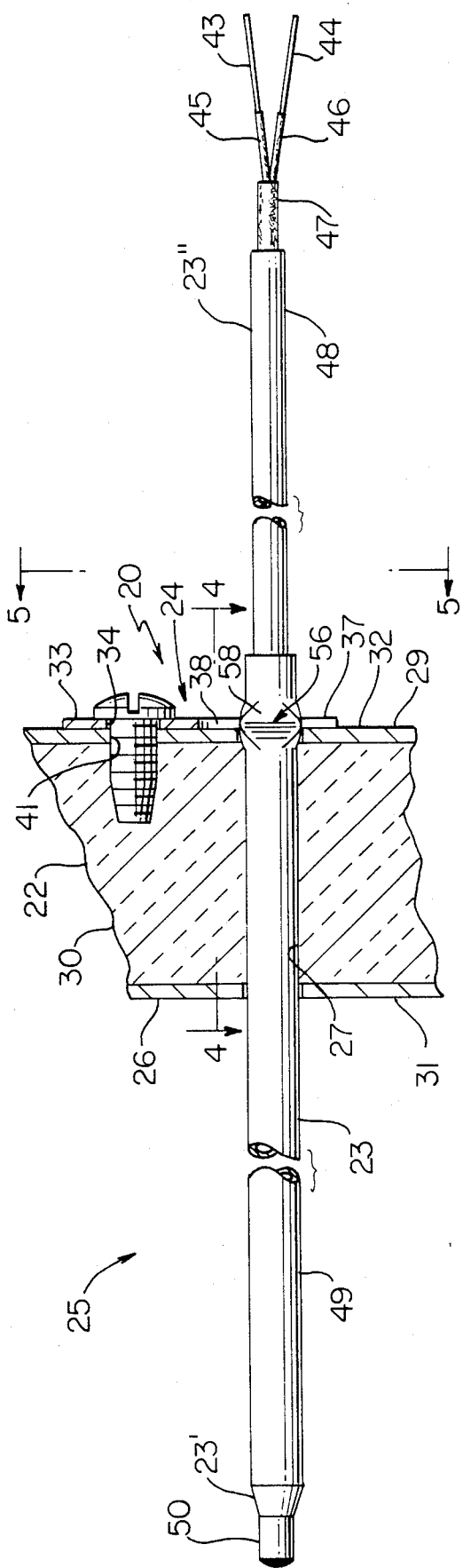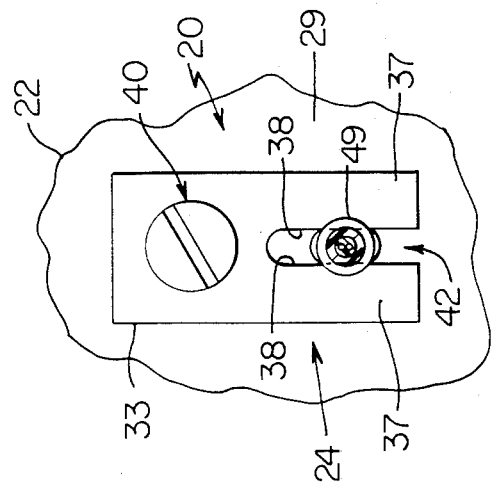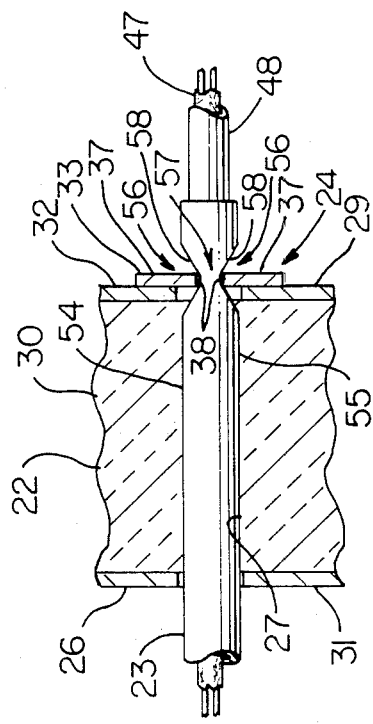

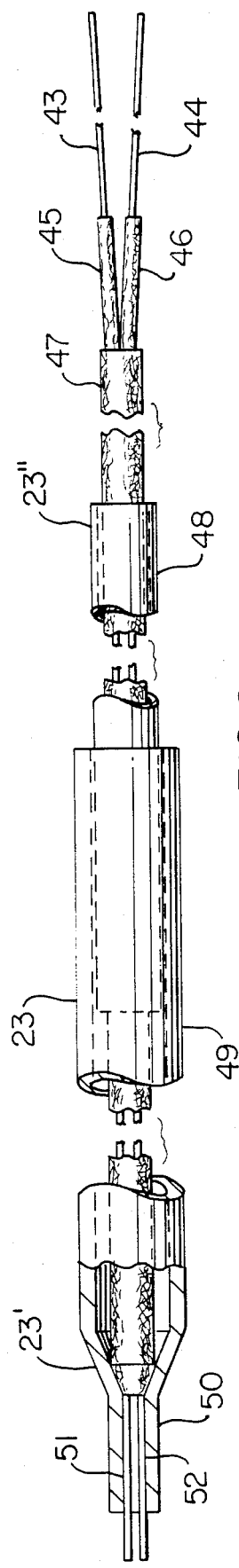
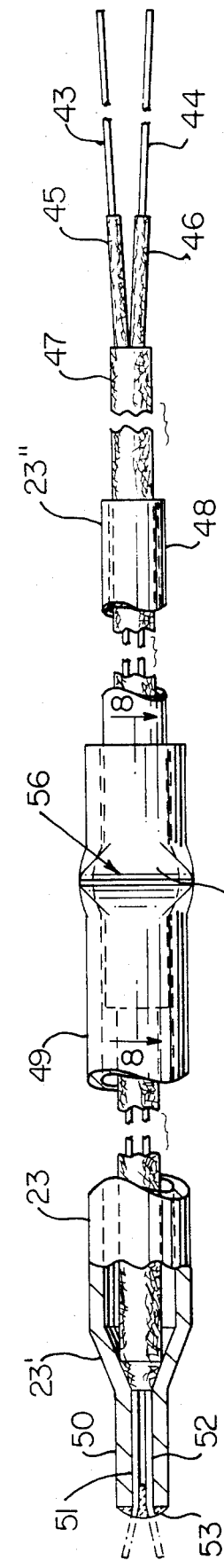
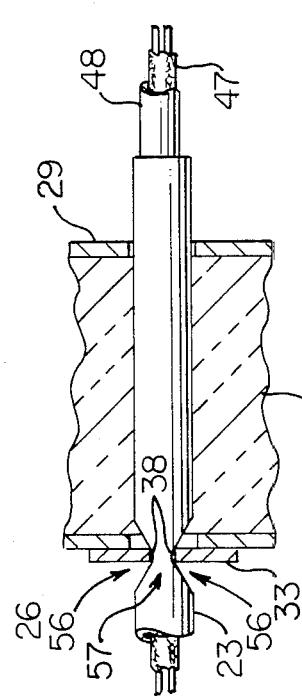
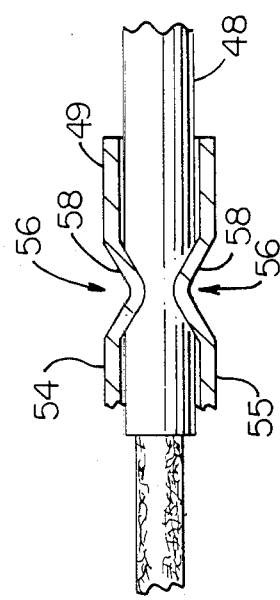

MOUNTING ARRANGEMENT FOR A CONDITION SENSING PROBE AND METHOD OF MAKING THE SAME

BACKGROUND OF THE INVENTION

1. Field of the Invention

This invention relates to an improved mounting arrangement for a condition sensing probe means and to a method of making such a mounting arrangement.

2. Prior Art Statement

It is known to provide an apparatus having a wall means provided with an exterior side and an interior side, the wall means having an opening means passing therethrough and having a condition sensing probe means disposed in the opening means. The probe has opposed ends one of which is disposed beyond the interior side of the wall and the other of which extends beyond the exterior side of the wall. A bracket means is secured to the wall means and has interconnection means operatively interconnected to interconnection means of the probe means whereby the bracket means holds the probe means in a fixed axial position in the opening means of the wall means. The interconnection means of the probe means and the bracket means comprises a weld that resulted from the welding of the bracket directly to the metal tube of the condition sensing probe means.

SUMMARY OF THE INVENTION

It is one feature of this invention to provide an improved mounting arrangement for a condition sensing probe means wherein the bracket means for mounting the probe means to a wall of an apparatus uniquely interconnects with the probe means in its assembled position without requiring an expensive welding operation as in the prior known probe mounting arrangement.

In particular, it was found according to the teachings of this invention that the bracket means could be made separate from the condition sensing probe means to be secured to the wall means of the apparatus that carries the probe means and can have an abutment means thereof disposed in a slot means of the probe means to hold the probe means in a fixed axial position in an opening means of the wall means of the apparatus.

For example, one embodiment of this invention provides an apparatus having a wall means provided with an exterior side and an interior side, the wall means having an opening means passing therethrough. A condition sensing probe means is disposed in the opening means and has opposed ends one of which is disposed beyond the interior side of the wall means and the other of which extends beyond the exterior side of the wall means. A bracket means is secured to the wall means and has interconnection means operatively interconnected to interconnection means of the probe means whereby the bracket means holds the probe means in a fixed axial position in the opening means of the wall means. The interconnection means of the probe means comprises slot means in the probe means and the interconnection means of the bracket means comprises abutment means disposed in the slot means to provide the sole interconnection between the bracket means and the probe means.

Accordingly, it is an object of this invention to provide an improved mounting arrangement for a condition sensing probe means and a wall means of an apparatus, the improved arrangement of this invention having one or more of the novel features of this invention as set forth above or hereinafter shown or described.

Another object of this invention is to provide an improved method of making such a mounting arrangement, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

BRIEF DESCRIPTION OF THE DRAWINGS

FIG. 1 is a fragmentary perspective view illustrating the improved mounting arrangement of this invention wherein a condition sensing probe means of this invention is uniquely secured in an opening means of a wall means of an apparatus or the like.

FIG. 3 is an enlarged fragmentary cross-sectional view taken on line 3—3 of FIG. 1.

FIG. 4 is a fragmentary cross-sectional view taken on line 4—4 of FIG. 3.

FIG. 5 is a fragmentary cross-sectional view taken on line 5—5 of FIG. 3.

FIG. 6 is an enlarged broken away view illustrating one step in the method of this invention for forming the condition sensing probe means of this invention.

FIG. 7 is a view similar to FIG. 6 and illustrates another step in the method of this invention.

FIG. 8 is a fragmentary cross-sectional view taken on line 8—8 of FIG. 7.

FIG. 9 is a view similar to FIG. 4 and illustrates another embodiment of this invention.

DESCRIPTION OF THE PREFERRED EMBODIMENTS

Figure 2:
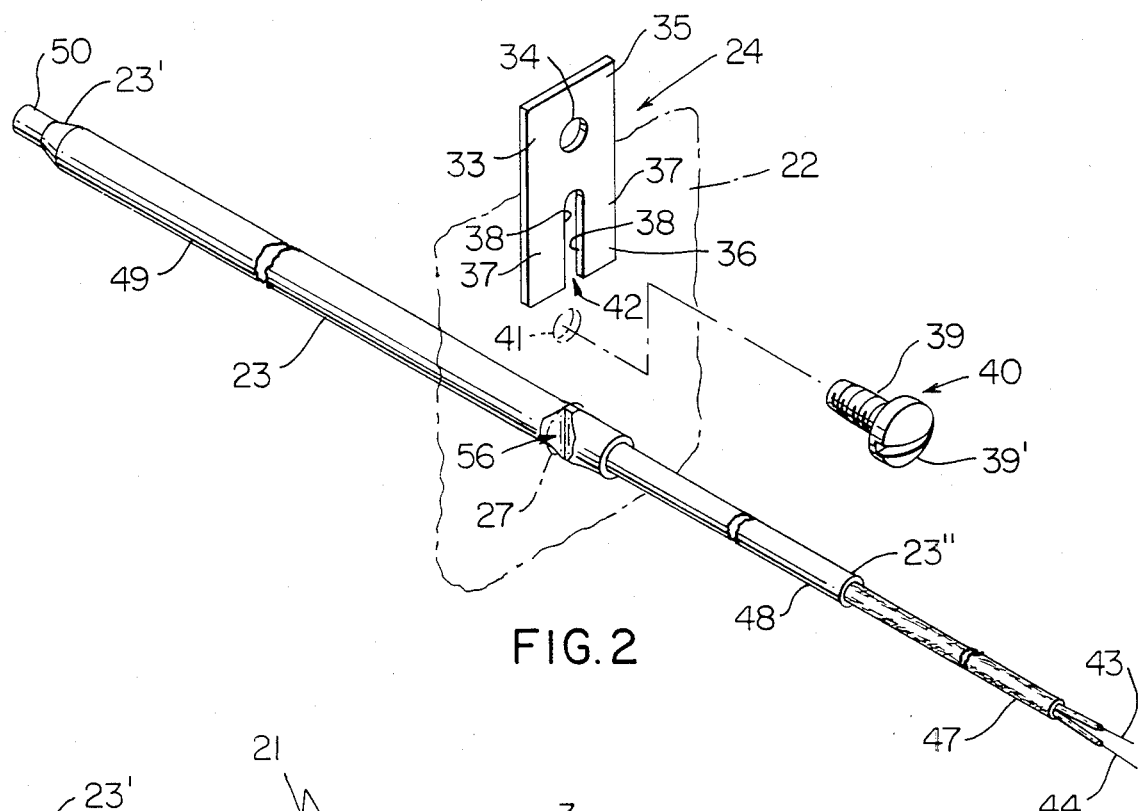
FIG. 2 is an exploded view similar to FIG. 1 and illustrates the improved parts of the mounting arrangement of this invention.

While the various features of this invention are hereinafter described and illustrated as being particularly adapted to provide a mounting arrangement for a temperature sensing probe means of a cooking apparatus, it is to be understood that the various features of this invention can be utilized singly or in any combination thereof to provide a mounting arrangement for a probe means that senses other conditions and/or is utilized with other types of apparatus, as desired.

Therefore, this invention is not to be limited to only the embodiments illustrated in the drawings, because the drawings are merely utilized to illustrate one of the wide variety of the uses of this invention.

Figure 1:
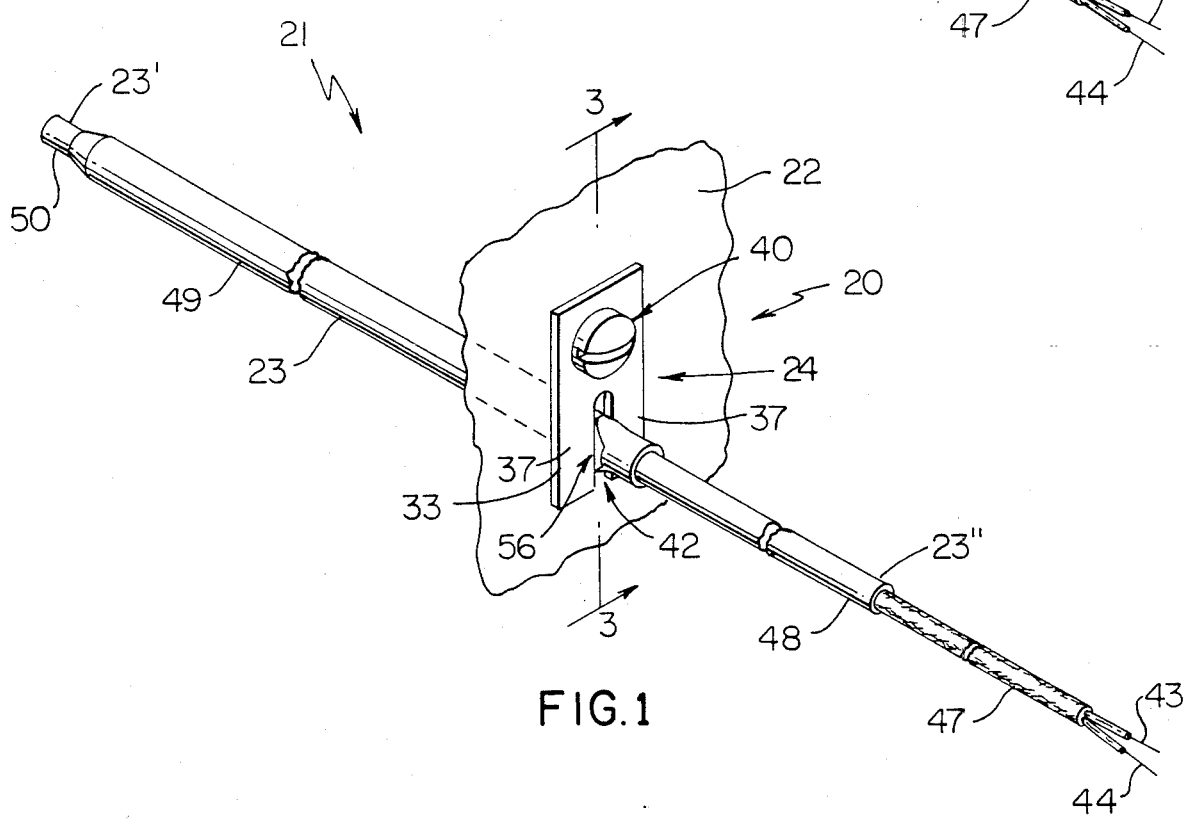

Referring now to FIG. 1, the improved mounting arrangement of this invention is generally indicated by the reference numeral 20 and comprises an apparatus that is generally indicated by the reference numeral 21, the apparatus 21 having a wall means 22 carrying a temperature sensing probe means 23 of this invention that is being held in the axial position illustrated in FIG. 1 by a unique bracket means of this invention that is generally indicated by the reference numeral 24.

While the apparatus 21 can be any suitable apparatus, the embodiment of the apparatus 21 illustrated in the drawings is a cooking apparatus wherein the cooking apparatus 21 as illustrated in FIG. 3 has a chamber 25 disposed adjacent an inside surface or side 26 of the wall 22 and the condition sensing probe means 23 has one end 23' positioned within the chamber 25 a suitable distance beyond the interior side 26 of the wall means 22 so as to sense the temperature inside the chamber 25 in a manner well known in the art whereby the details of the operation of the temperature sensing probe means 23 of this invention need not be set forth. However, it can be seen that the probe means 23 comprises a temperature sensing probe means of the thermocouple type as will be apparent hereinafter.

The probe means 23 is disposed in an opening means 27 passing through the wall means 22 so that the other opposed end 23" of the probe means 23 extends beyond the exterior surface or side 29 of the wall means 22 a desired distance for coupling the end 23" of the probe means 23 to the desired electrical circuit means or the like.

While the wall means 22 is described as having an interior side 26 and an exterior side 29, it is to be understood that the side 29 is merely exterior to the side 26 and could actually by an interior portion of the apparatus 21 carrying the same, if desired.

Also, while the wall means 22 can be of any suitable construction, the wall means 22 illustrated in FIGS. 3 and 4 comprises an insulated wall means for a cooking apparatus or the like wherein suitable insulation means 30 is disposed between two metallic wall members 31 and 32 which respectively define the sides 26 and 29 of the wall means 22 whereby the wall means 22 is conventional in the art.

The bracket means 24 of this invention comprises a substantially rectangular flat metal plate 33 as illustrated in FIG. 2 which has an opening 34 passing through the upper end 35 thereof while the lower end 36 thereof is bifurcated to define two parallel legs 37 respectively having inside straight edges 38 disposed spaced and parallel to each other for a purpose hereinafter described. The bracket means or plate 33 is adapted to be secured to the wall 22 by having the threaded shank portion 39 of a threaded fastening member 40 disposed through the opening 34 of the plate 33 and be threaded into a suitable threaded opening or self-tapped opening 41 in the side 29 of the wall 22 so as to position the bight 42 between the legs 37 of the bracket member 33 to straddle the opening 27 through the wall means 22 for a purpose hereinafter described, the bracket 33 being secured to the wall 22 after the probe 23 has been assembled in the opening 27 of the wall means 22 as will be apparent hereinafter and being sandwiched between the side 29 of the wall means 22 and the enlarged head 39' of the fastening member 40.

The condition sensing probe means 23 of this invention comprises a pair of thermocouple wires 43 and 44 each suitably insulated by insulation means 45 and 46 in a manner well known in the art and having an outer sleeve 47 of insulation means therearound. In addition, an outer insulation sleeve 48 is disposed over the sleeve 47 and can comprise a flexible fiberglass sleeve or the like. An outer tubular member 49 of metallic material, such as stainless steel, is, in turn, disposed over the sleeve 48 and has one end 50 inwardly swaged so as to be disposed about the bared ends 51 and 52 of the thermocouple wires 43 and 44 which initially project out of the end 50 of the metallic tubular member 49 in the manner illustrated in FIG. 6. The ends 51 and 52 of the thermocouple wires 43 and 44 are welded together by weld means 53 as illustrated in FIG. 7 and the extensions thereof are cut away as represented by the dashed portions of the wires 43 and 44 in FIG. 7 to complete the sensing end 23' of the sensing probe 23 in a manner well known in the art.

Either before or after the weld 53 has been made, the outer sleeve or tubular member 49 is inwardly crimped to not only hold the parts of the sensing probe means 23 together and prevent the pulling apart of the welded ends 51 and 52 of the thermocouple wires 43 and 44 should a subsequent outward pulling force be imposed upon the free ends of the sleeve 48, sleeve 47 and/or wires 43 and 44 as is well known in the art, but also to provide a means for uniquely mounting the sensing probe means 23 to a wall means of a suitable apparatus in a manner hereinafter set forth whereby such crimping of the outer sleeve or tubular member 49 of this invention provides a dual function that was not provided by the crimping of the prior known sensing probe means as the prior known crimping was solely for the purpose of holding the parts of the sensing probe means together.

In particular, the metal tubular member 49 of the sensing probe 23 has the opposed sides 54 and 55 thereof inwardly crimped to define a pair of slots 56 in the opposed sides 54 and 55 thereof that extend transverse to the longitudinal axis of the probe 23 and that hold the parts of the probe means 23 together, the crimping of the tube 23 being in the area generally indicated by the reference numeral 57 in FIG. 4 and being so located that the slots 56 will locate the end 23' of the probe 23 at the desired distance from the inside surface 26 of the wall 22 when the probe 23 is inserted therein to the axial position illustrated in FIG. 3. The slot means 56 are disposed adjacent the side 29 of the wall means 22 to receive the legs 37 of the bracket means 24 therein with the straight side edges 38 of the legs 37 being disposed closely adjacent the inwardly crimped walls or portions 58 of the sides 54 and 55 of the probe 23 so that the probe 23 is held in the axial position illustrated in FIG. 3 by the bracket 24 in such a manner that the probe 23 cannot move inwardly or outwardly in the opening 27 through the abutting action of the abutments or legs 37 with the crimped walls 58 of the probe 23 in the manner illustrated in FIG. 4.

Therefore, it can be seen that it is a relatively simple method of this invention to form the bracket means 24 as a substantially flat plate 33 and form the slot means 56 in the condition sensing probe means 23 through a simple crimping operation of the opposed sides 54 and 55 thereof that not only tends to hold the parts of the probe means 23 together, but which also permits the bracket means 24 to mount the sensing probe means 23 in a proper axial position in the opening means 27 of the wall means 22 in a manner now to be described.

After the probe means 23 of this invention has been made and crimped in the proper area 57 for the particular application thereof with the wall means 22, the probe means 23 is inserted into the opening means 27 so that the crimped area 57 thereof is disposed adjacent the exterior side 29 thereof as illustrated in FIGS. 3 and 4. Thereafter, the bracket member 33 is disposed against the surface 29 of the wall 22 and moved downwardly over the probe 23 so that the crimped area 57 of the probe 23 is received in the bight 42 between the legs 37 of the bracket member 33 until the opening 34 of the bracket 33 is aligned with the opening 41 in the wall 22. At this time, the threaded fastening member 40 is inserted into the aligned openings 34 and 41 and threaded therein so that the enlarged head 39' of the fastening member 40 will sandwich the bracket member 33 against the side 29 of the wall 22 in the manner illustrated in FIG. 3 to fasten the bracket member 33 thereto.

As illustrated in FIGS. 4 and 5, the inner edges 38 of the legs 37 are fully received in the slots 56 of the probe 23 so that the same will engage against the crimped portions 58 of the sides 54 and 55 thereof to prevent the probe 23 from being moved axially inwardly or outwardly in the opening means 27 of the wall means 22 so that the end 23' of the probe means 23 is properly positioned relative to the inside surface 26 of the wall means 22 as illustrated in FIG. 3.

While the mounting arrangement for the probe means 23 previously described has the probe means 23 so arranged that the bracket member 33 is mounted to the exterior side 29 of the wall means 22, it is to be understood that the crimped area 57 in the probe means 23 could be so located that the bracket member 33 would be mounted against the interior side 26 of the wall means 22 if desired.

For example, reference is now made to FIG. 9 wherein it can be seen that the crimped area 57 of the probe means 23 thereof is arranged to be adjacent the side 26 of the wall means 22 and the bracket member 33 is secured to the side 26 of the wall means 22 by the fastening member 40 in the same manner as previously described with the end 23" of the probe means 23 extending beyond the exterior side 29 of the wall means 22 as illustrated.

In any event, it can be seen that only one fastening member 40 is needed as the bracket means 24 uniquely cooperates with the probe 23 to hold the probe in its assembled axial position in the wall means 22.

Therefore, it can be seen that this invention not only provides an improved mounting arrangement for a condition sensing probe means, but also this invention provides an improved method of making such a mounting arrangement.

While the forms and method steps now preferred have been illustrated and described as required by the Patent Statute, it is to be understood that other forms and method steps can be utilized and still fall within the scope of the appended claims.

I claim:

1. In an apparatus having a wall means provided with an exterior side and an interior side, said wall means having an opening means passing therethrough, a condition sensing probe means disposed in said opening means and having opposed ends one of which is disposed beyond said interior side of said wall means and the other of which extends beyond said exterior side of said wall means, and a bracket means secured to said wall means and having interconnection means operatively interconnected to interconnection means of said probe means whereby said bracket means holds said probe means in a fixed axial position in said opening means of said wall means, the improvement wherein said interconnection means of said probe means comprises slot means in said probe means and said interconnection means of said bracket means comprises abutment means disposed in said slot means to provide the sole interconnection between said bracket means and said probe means.

2. An apparatus as set forth in claim 1 wherein said slot means of said probe means is disposed transverse to said opening means of said wall means.

3. An apparatus as set forth in claim 2 wherein said slot means of said probe means comprises two slots respectively disposed on opposite sides of said probe means, said abutment means of said bracket means comprising two spaced apart abutments respectively disposed in said slots.

4. An apparatus as set forth in claim 3 wherein said bracket means comprises a substantially flat plate having opposed ends, one of said ends of said plate being secured to said wall means and the other of said ends of said plate being bifurcated to define two legs that comprise said abutments thereof.

5. An apparatus as set forth in claim 4 wherein said legs of said plate respectively have substantially straight parallel inside edges facing each other and being respectively received in said slots.

6. An apparatus as set forth in claim 5 wherein said slots of said probe means comprise a crimp in said opposed sides thereof, said crimp tending to hold the parts of said probe means together.

7. An apparatus as set forth in claim 5 wherein said one end of said plate is secured to said exterior side of said wall means.

8. An apparatus as set forth in claim 5 wherein said one end of said plate is secured to said interior side of said wall means.

9. An apparatus as set forth in claim 5 wherein said probe means has an outer metallic tube defining the outer peripheral surface thereof, said tube being crimped from opposed sides thereof to define said slots and to tend to hold the parts of said probe means together.

10. An apparatus as set forth in claim 9 wherein said probe means has thermocouple wire means disposed in said tube.

11. In a method of making an apparatus comprising the steps of providing a wall means having an exterior side and an interior side, forming said wall means with an opening means passing therethrough, disposing a condition sensing probe means in said opening means so as to have one of the opposed ends thereof disposed beyond said interior side of said wall means and the other of the opposed ends thereof disposed beyond said exterior side of said wall means, and securing a bracket means to said wall means, said bracket means having interconnection means operatively interconnected to interconnection means of said probe means whereby said bracket means holds said probe means in a fixed axial position in said opening means of said wall means, the improvement comprising the steps of forming said interconnection means of said probe means to comprise slot means in said probe means, and forming said interconnection means of said bracket means to comprise abutment means disposed in said slot means to provide the sole interconnection between said bracket means and said probe means.

12. A method as set forth in claim 11 and including the step of forming said slot means of said probe means to be disposed transverse to said opening means of said wall means.

13. A method as set forth in claim 12 and including the steps of forming said slot means of said probe means to comprise two slots respectively disposed on opposite sides of said probe means, and forming said abutment means of said bracket means to comprise two spaced apart abutments respectively disposed in said slots.

14. A method as set forth in claim 13 and including the steps of forming said bracket means to comprise a substantially flat plate having opposed ends, securing one of said ends of said plate to said wall means, and bifurcating the other of said ends of said plate to define two legs that comprise said abutments thereof.

15. A method as set forth in claim 14 and including the step of forming said legs of said plate to respectively have substantially straight parallel inside edges facing each other and being respectively received in said slots.

16. A method as set forth in claim 15 and including the step of forming said slots of said probe means by crimping in said opposed sides thereof whereby the resulting crimp in said probe means also tends to hold the parts of said probe means together.

17. A method as set forth in claim 15 wherein the step of securing causes said one end of said plate to be secured to said exterior side of said wall means.

18. A method as set forth in claim 15 wherein the step of securing causes said one end of said plate to be secured to said interior side of said wall means.

19. A method as set forth in claim 15 and including the steps of forming said probe means to have an outer metallic tube defining the outer peripheral surface thereof, and crimping said tube from opposed sides thereof to define said slots and to tend to hold the parts of said probe means together.

20. A method as set forth in claim 19 and including the step of forming said probe means to have thermocouple wire means disposed in said tube.

* * * * *